United States Patent [19]

Okamoto et al.

[11] Patent Number: 4,767,154
[45] Date of Patent: Aug. 30, 1988

[54] AUTOMOBILE ROOF STRUCTURE

[75] Inventors: Kazuo Okamoto, Toyota; Hiroshi Ohhashi, Okazaki; Tokuichi Tatsumoto, Toyota, all of Japan

[73] Assignee: Toyota Jidosha Kabushiki Kaisha, Aichi, Japan

[21] Appl. No.: 25,712

[22] Filed: Mar. 13, 1987

[30] Foreign Application Priority Data

Apr. 30, 1986 [JP] Japan .................... 61-100239

[51] Int. Cl.⁴ .................................... B60D 25/06
[52] U.S. Cl. .......................... 296/218; 296/210
[58] Field of Search ............... 296/210, 213, 216, 218, 296/120 A, 121

[56] References Cited

U.S. PATENT DOCUMENTS

| | | | |
|---|---|---|---|
| 2,382,635 | 8/1945 | Humer | 296/121 X |
| 2,741,503 | 4/1956 | Thompson, III | 296/120 A |
| 3,476,437 | 11/1969 | Schroeder et al. | 296/218 |
| 3,494,659 | 2/1970 | Trenkler | 296/218 |
| 3,526,427 | 11/1970 | Trenkler et al. | 296/219 |
| 3,584,912 | 6/1971 | Leger | 296/121 X |
| 3,610,681 | 10/1971 | Trenkler et al. | 296/218 |
| 4,475,765 | 10/1984 | Vogt et al. | 296/210 |
| 4,664,436 | 5/1987 | Eyb | 296/121 |

FOREIGN PATENT DOCUMENTS 60-9730  1/1985 Japan .

Primary Examiner—Robert B. Reeves
Assistant Examiner—Russell D. Stormer
Attorney, Agent, or Firm—Parkhurst & Oliff

[57] ABSTRACT

An automobile roof structure includes a detachable roof section, a front fixed roof section, a fastening device and a holding member. The fastening device includes a first engaging member and a second engaging which assist in the alignment of the detachable roof section. The first engaging member is secured to the detachable roof section and located in the vicinity of an aperture in the detachable roof section. The second engaging member is selectively inserted into the aperture of the detachable roof section and selectively engages the first engaging member. The holding member includes a first end and a second end. The first end of the holding member is secured to the front roof section, and the second end of the holding member is secured to the second engaging member. The holding member retains the second engaging member in a proper position when the second engaging member is not engaging the first engaging member.

20 Claims, 6 Drawing Sheets

AUTOMOBILE ROOF STRUCTURE

BACKGROUND OF THE INVENTION

The present invention relates to an automobile roof structure which includes a detachable roof section and a windshield frame. The detachable roof section is secured selectively to the windshield frame by a simple fastening means. More particularly, the present invention relates to improvements in fastening means for fastening the detachable roof section to the windshield frame. The fastening means of the present invention obviates the installation problems encountered with known devices.

U.S. Pat. No. 3,610,681 discloses an automobile roof structure which includes a detachable roof section, first and second fastening means for fastening the detachable roof section to a windshield frame and a roll bar.

The first fastening means includes a tension-locking device. The second fastening means includes clamping locks.

However, this conventional automobile roof structure is complex and includes many components.

SUMMARY OF THE INVENTION

The present invention was developed in view of the foregoing background and to overcome the foregoing drawbacks. It is accordingly an object of the present invention to provide an automobile roof structure which includes a detachable roof section, a fastening means and a holding means.

Another object of the present invention is to prevent the fastening means from dropping down from a fixed roof section and to securely fasten the detachable roof section to a fixed roof section of a vehicle.

The automobile roof structure of the present invention includes a detachable roof section, a fixed roof section, a fastening means and a holding means.

The fixed roof section includes a bracket extending from the fixed roof section.

The detachable roof section is selectively mounted on the bracket of the fixed roof section. The detachable roof section includes an aperture.

The fastening means includes a first engaging member and a second engaging member.

The first engaging member is secured to the detachable roof section and is located in the vicinity of the aperture of the detachable roof section.

The second engaging member is selectively inserted into the aperture of the detachable roof section. The second engaging member includes an engaging portion, and selectively engages with the first engaging member.

The holding means includes a first end and a second end. The first end of the holding means is secured to the fixed roof section. The second end of the holding means is secured to the second engaging member.

Accordingly, even when the engaging portion of the second engaging member does not engage with the first engaging member, the second engaging member does not drop down from the fixed roof section.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate preferred different embodiments according to the present invention.

Figure 1:
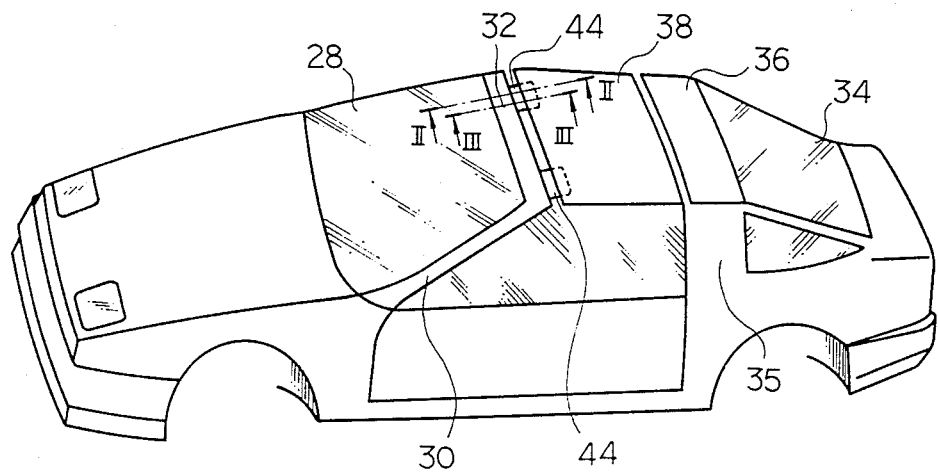
FIG. 1 is a perspective view of a vehicle including a first fastening means.

Referring to FIG. 1, a vehicle includes a windshield 28, a front pillar 30, a front roof section 32, a detachable roof section 38, a rear roof section 36, a center pillar 35 and a rear window 34. The front pillar 30 is connected and secured to the front roof section 32. The front pillar 30 and the front roof section 32 surround the windshield 28 (i.e., the front pillar 30 and the front roof section 32 constitute a windshield frame). The rear roof section 36 is connected to the center pillar 35. The rear roof section 36 and the center pillar 35 constitute a roll bar.

The detachable roof section 38 is positioned between the front roof section 32 and the rear roof section 36, and the detachable roof section 38 covers a passenger compartment. The detachable roof section 38 includes front and rear portions.

Figure 2:
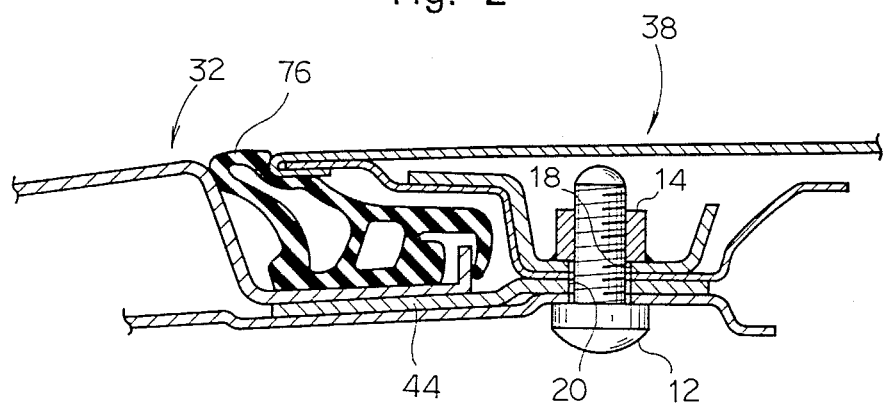
FIG. 2 is a cross-sectional view of the first fastening means taken along the line II—II in FIG. 1, wherein a detachable roof section is positioned properly, and the detachable roof section is secured to a front roof section by a first bolt.
Figure 3:
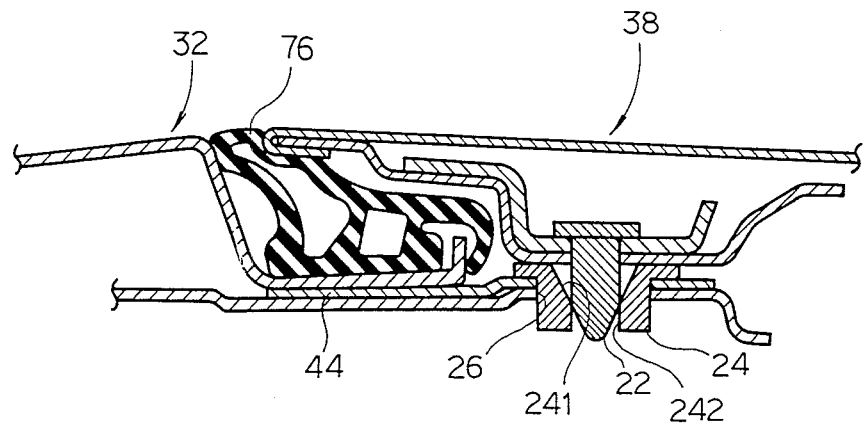
FIG. 3 is a cross-sectional view of the first fastening means taken along the line III—III in FIG. 1, wherein the detachable roof section is positioned properly.
Figure 4:
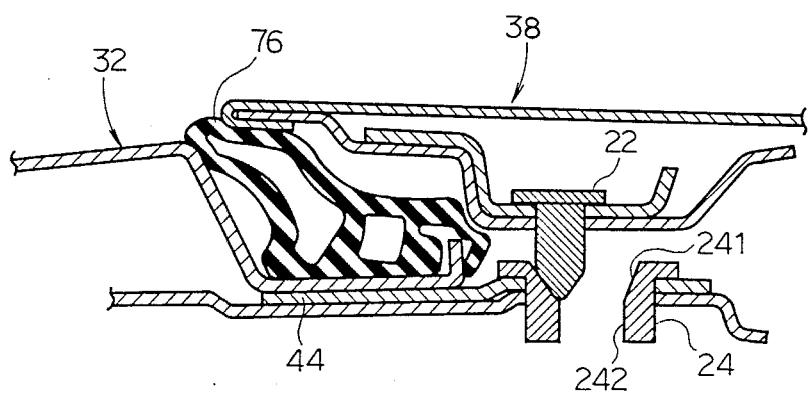
FIG. 4 is a cross-sectional view of the first fastening means taken along the line III—III in FIG. 1, wherein the detachable roof section is not positioned properly.

As shown in FIGS. 2 and 3, the front portion of the detachable roof section 38 is selectively mounted on the front roof section 32, and the detachable roof section 38 is selectively secured to the front roof section 32. The front portion of the detachable roof section 38 includes a plurality of holes 18 and a plurality of projections 22.

Each hole 18 is located apart from the corresponding projection 22 in the lateral direction of the vehicle. A nut 14 or first engaging member is secured to the front portion of the detachable roof section 38. A center line of the nut 14 corresponds to a center line of the hole 18 of the detachable roof section 38.

The front roof section 32 includes a plurality of brackets 44 which project rearwardly in the longitudinal direction of the vehicle. Each bracket 44 includes two spaced holes 20 and 26 therewithin. One hole 20 of each bracket 44 corresponds to or is aligned with the hole 18 of the detachable roof section 38. In a normal condition, the other hole 26 of the bracket 44 corresponds to the projection 22 of the detachable roof section 38. A guiding member 24 is inserted into the hole 26 for the projection 22. The guiding member 24 includes a guiding surface 241 and a positioning hole 242.

The holes 18 in the detachable roof, the nuts 14 and the projections 22 of the detachable roof section 38, the aligning holes 20 of the bracket 44 and the guiding members 24 of the front roof section 32 and the bolts 12 constitute a first fastening means.

In a normal securing condition, as shown in FIGS. 2 and 3, a bolt 12 or second engaging member is inserted into the aligned holes 20 and 18, and the bolt 12 engages with the nut 14. Simultaneously, the projection 22 is positioned within the positioning hole 242. Accordingly, the detachable roof section 38 and the front roof section 32 form a substantially flush surface, and a space defined between the detachable roof section 38 and the front roof section 32, is effectively sealed by a weather strip 76.

However, when due to manufacturing error, the projection 22 of the detachable roof section 38 is not aligned with the positioning hole 242 of the guiding member 24, the projection 22 of the detachable roof section 38 is located on the guiding surface 241 of the guiding member 24. Accordingly, the detachable roof section 38 projects from the front roof section 32, and sealing effect between the detachable roof section 38 and the front roof section 32 is deteriorated.

Thus, in order to prevent the detachable roof section 38 from projecting from the front roof section 32, a first distance, defined between the projection 22 and the hole 18 of the detachable roof section 38, must be the same as a second distance defined between the aligned hole 20 of the front roof section 32 and the positioning hole 242 of the guiding member 24.

However, when due to manufacturing error, the first distance is not the same as the second distance, the detachable roof section 38 might not be secured to the front roof section 32 or the sealing effect between the detachable roof section 38 and the front roof section 32 might be deteriorated.

Figure 6:
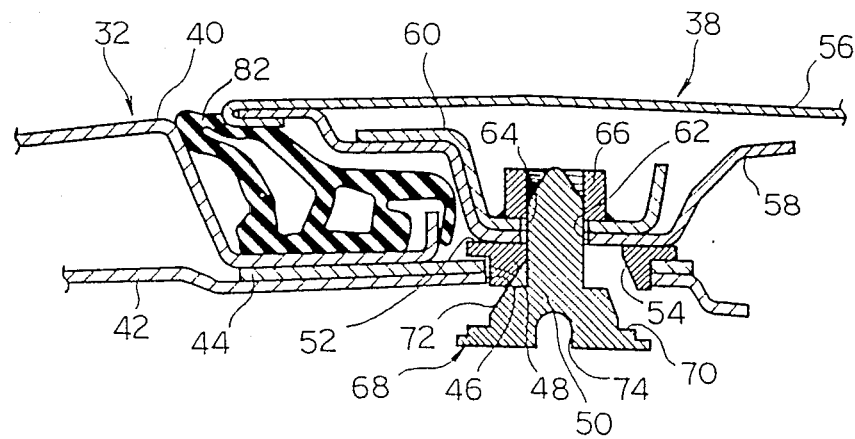
FIG. 6 is a cross-sectional view of the second fastening means, wherein the detachable section is positioned properly.
Figure 5:
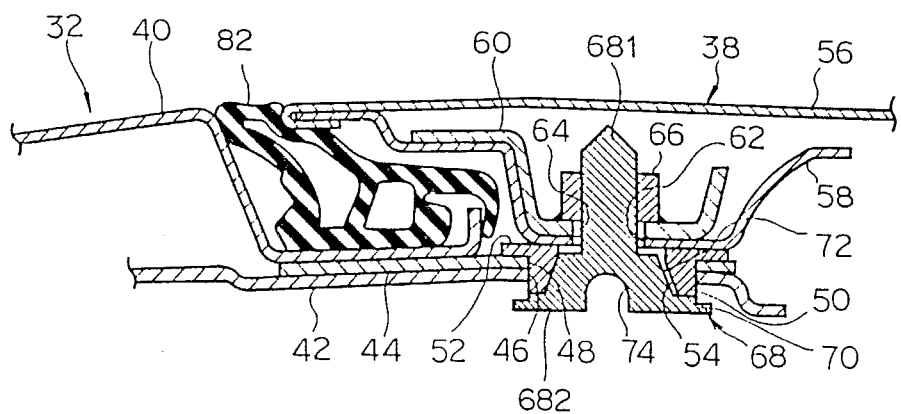
FIG. 5 is a cross-sectional view of second fastening means, wherein the detachable roof section is positioned properly, and the detachable roof section is secured to the front roof section by a second bolt.

FIGS. 5 and 6 show a second fastening means embodiment, provided between the detachable roof section 38 and the front roof section 32.

As shown in FIG. 6, the second fastening means includes guiding means 50 and a bolt 68. The guiding means 50 is inserted into a hole 46 defined within a pillar inner panel 42 and an aligned hole 48 defined within a bracket 44. The guiding means 50 includes a flange 52 secured to the bracket 44 by welding. The guiding means 50 includes a tapered hole 54 (i.e., the inner diameter of the lower edge of tapered hole 54 is larger than the inner diameter of the upper edge of tapered hole 54) and the tapered hole 54 includes a smooth surface thereon. A front portion of the bracket 44 is sandwiched between and secured to the pillar inner panel 42 and a roof header outer panel 40. The pillar inner panel 42 is connected to the front pillar 30. The roof header outer panel 40 constitutes a rear portion of the front roof section 32. A weather strip 82 is mounted on a rear portion of the roof header outer panel 40. The bracket 44 extends rearwardly in the longitudinal direction of the vehicle. The bracket 44 is located vertically below an outer surface of the front roof section 32.

The detachable roof section 38 includes a roof outer panel 56 and a roof inner panel 58.

A front edge of the roof outer panel 56 is secured to a front edge of the roof inner panel 58. The weather strip 82 is sandwiched between the roof header outer panel 40 and the front edge of the roof outer panel 56, as a result, a space, defined between the roof header outer panel 40 and the front edge of the roof outer panel 56, is effectively sealed.

A portion of the roof inner panel 58 projects downwardly and includes a hole 62. A reinforcement 60 is secured to the projecting portion of the roof inner panel 58, and includes another hole 64 corresponding to and aligned with the hole 62 of the roof inner panel 58. A nut 66 is welded on the reinforcement 60, and the nut 66 includes a threaded hole. The nut 66 has the function of a first engaging member. The center line of the threaded hole of the nut 66 is the substantially aligned with the center line of the hole 62 of the roof inner panel 58.

The bolt 68 of the second fastening means includes a threaded engaging portion 681 and a head portion 682. The head portion 68 includes a smooth tapered surface 72, a flange 70 and an adjusting recess 74. The bolt 68 functions as a second engaging member. The tapered surface 72 includes a small diameter edge and a large diameter edge. The outer diameter of the small diameter edge of the tapered surface 72 of the bolt 68 is smaller than the outer diameter of the upper edge of the tapered hole 54 of the guiding means 50. The outer diameter of the large diameter edge of the tapered surface 72 of the bolt 68 is greater than the inner diameter of the upper edge of the tapered hole 54 of the guiding means 50. The outer diameter of the large diameter edge of the tapered surface 72 of the bolt 68 is smaller than the inner diameter of the lower edge of the tapered hole 54 of the guiding means 50. The small diameter edge of the tapered surface 72 is located in the vicinity of the threaded portion 681 of the bolt 68. The large diameter edge of the tapered surface 72 is located apart from the threaded portion 681. The flange 70 extends outwardly and is located in the vicinity of the large diameter portion.

When the threaded portion 681 of the second bolt 68 engages with and is threaded into the threaded hole of the nut 66, the guiding means 50 is clamped between the flange 70 of the bolt 68 and the projection portion of the roof inner panel 58. In this condition, a portion of the tapered surface 72 of the bolt 68 is not in contact with a portion of the tapered hole 54 of the guiding means 50. An adjusting recess 74 is defined within the head portion 682, and when the bolt 68 is to be threaded into or out of the nut 66, a coin or a screwdriver is inserted into the adjusting recess 74.

The process of fastening the detachable roof section 38 to the front roof section 32 is disclosed hereinafter.

First, the detachable roof section 38 is mounted on the front and rear roof sections 32 and 36 of the vehicle.

When the detachable roof section 38 is not positioned properly, the center line of the guiding means 50 is located apart from the center line of the bolt 68.

However, when the bolt 68 is threaded into the nut 66, the tapered surface 72 of the bolt 68 contacts the tapered hole 54 of the guiding means 50.

As a result, the bolt 68 forces the detachable roof section 38 to move toward the proper position.

Therefore, the detachable roof section 38 is positioned properly and the space defined between the front edge of the detachable roof section 38 and the front roof section 32, is securely sealed.

However, the bolt 68 is separatable from the front roof section 32 so that when the detachable roof section 38 is removed from the front roof section 32 and the rear roof section 36, it is troublesome to retain the bolt 68 in a suitable position.

Figure 8:
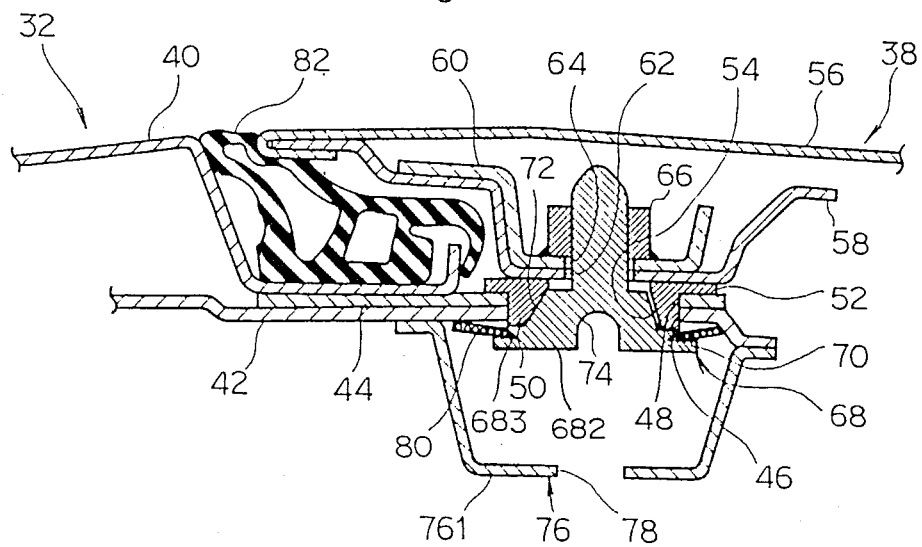
FIG. 8 is a cross-sectional view of the third fastening means taken along the line VIII—VIII in FIG. 7, wherein the detachable roof section is positioned properly, and the detachable roof section is secured to the front roof section by the second bolt.
Figure 7:
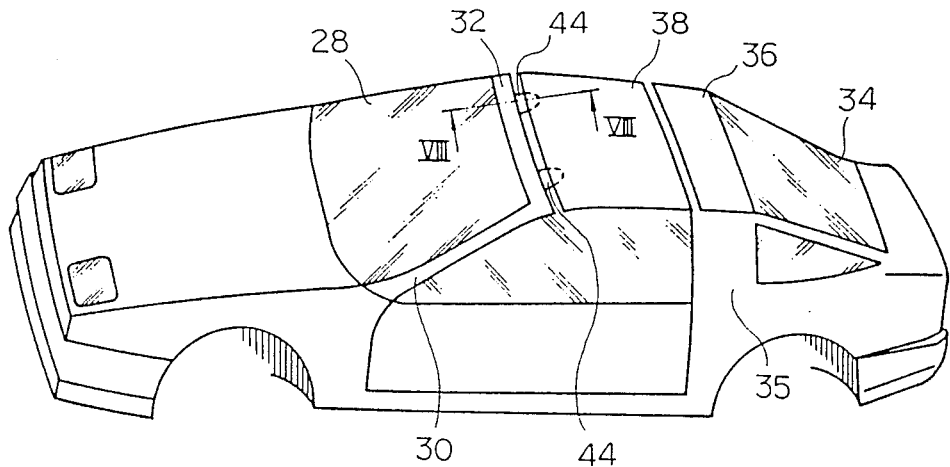
FIG. 7 is a perspective view of a vehicle including third fastening means according to the present invention.
Figure 9:
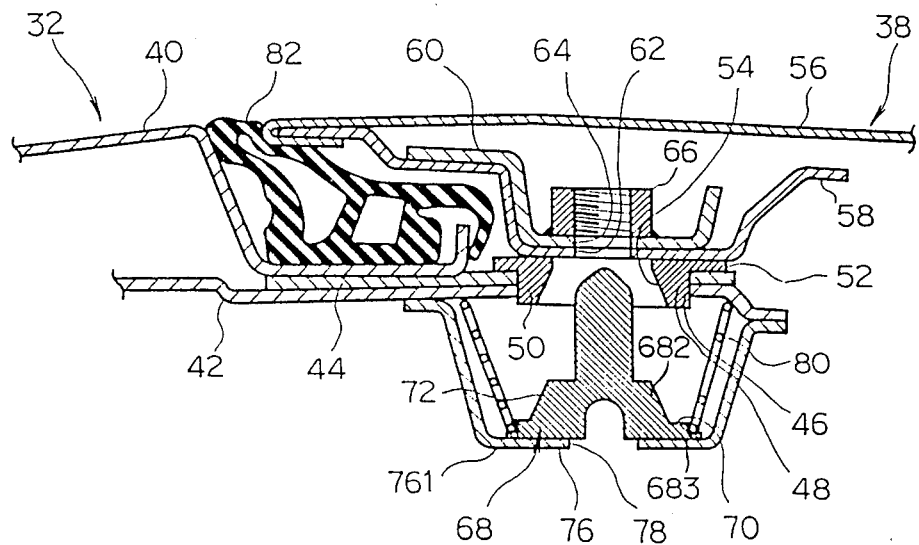
FIG. 9 is a cross-sectional view of the second embodiment taken along the line VIII—VIII in FIG. 7, wherein the second bolt is biased toward a bottom flange of an under cover.

FIGS. 7 through 9 show a third fastening means, provided between the detachable roof section 38 and the front roof section 32, according to the present invention.

As shown in FIG. 8, the third fastening means includes the guiding means 50, a bolt 68, an under cover 76 and holding means 80. The guiding means 50 is inserted into a hole 46 defined within a pillar inner panel 42 and an aligned hole 48 defined within a bracket 44. The guiding means 50 includes a flange 52 secured to the bracket 44 by welding. The guiding means 50 includes a smooth tapered hole 54 (i.e., the inner diameter of the lower edge of the tapered hole 54 is larger than the inner diameter of the upper edge of the tapered hole 54). A front portion of the bracket 44 is sandwiched between and secured to the pillar inner panel 42 and a roof header outer panel 40. The pillar inner panel 42 is connected to the front pillar 30. The roof header outer panel 40 constitutes a rear portion of the front roof section 32. A weather strip 82 is mounted on a rear portion of the roof header outer panel 40. The bracket 44 extends rearwardly in the longitudinal direction of the vehicle. The bracket 44 is located vertically below an outer surface of the front roof section 32.

The detachable roof section 38 includes a roof outer panel 56 and a roof inner panel 58.

A front edge of the roof outer panel 56 is secured to a front edge of the roof inner panel 58. The weather strip 82 is sandwiched between the roof header outer panel 40 and the front edge of the roof outer panel 56, as a result, a space defined between the roof header outer panel 40 and the front edge of the roof outer panel 56, is effectively sealed.

A portion of the roof inner panel 58 projects downwardly and includes a hole 62. A reinforcement 60 is secured to the projecting portion of the roof inner panel 58, and includes an aligned hole 64 corresponding to the hole 62 of the roof inner panel 58. A nut 66 is welded on the reinforcement 60, and the nut 66 includes a threaded hole. The nut 66 functions as a first engaging member. The center line of the threaded hole of the nut 66 is substantially aligned with the center line of the hole 62 of the roof inner panel 58.

The bolt 68 of the second fastening means includes a threaded portion 681 and a head portion 682. Further, the head portion 682 includes a tapered surface 72, a flange 70 and an adjusting recess 74. The bolt 68 functions as a second engaging member. The tapered surface 72 includes a small diameter edge and a large diameter edge. The tapered surface 72 is a smooth surface. The outer diameter of the small diameter edge of the tapered surface 72 of the bolt 68 is smaller than the outer diameter of the upper edge of the tapered hole 54 of the guiding means 50. The outer diameter of the large diameter edge of the tapered surface 72 of the bolt 68 is greater than the inner diameter of the upper edge of the tapered hole 54 of the guiding means 50. The outer diameter of the large diameter edge of the tapered surface 72 of the bolt 68 is smaller than the inner diameter of the lower edge of the tapered hole 54 of the guiding means 50. The outer diameter of the small diameter edge of the tapered surface 72 is located in the vicinity of the threaded portion 681 of the bolt 68. The outer diameter of the large diameter edge of the tapered surface 72 is located apart from the threaded portion 681. A flange 70 is located in the vicinity of the large diameter portion and the flange 70 extends outwardly.

The under cover 76 is secured to a lower surface of the pillar inner panel 42. The under cover 76 includes a bottom flange 761 and an aperture 78 defined within the bottom flange 761. A center line of the aperture 78 corresponds to the center line of the tapered hole 54 of the guiding means 50. The aperture 78 has a smaller diameter than the inner diameter of the upper edge of the tapered hole 54 of the guiding means 50.

Accordingly, even when the bolt 68 is not engaged with the nut 66, the bolt 68 can not drop out from the under cover 76.

Further, the holding means 80 is preferably a conical spring. One end of the conical spring 80 is fixed to the lower surface of the pillar inner panel 42 and the other end of the conical spring 80 is inserted into and secured to a V-shape securing groove 683 defined within the flange 70 of the bolt 68. As shown in FIG. 9, the conical spring 80 biases the bolt 68 toward the bottom flanges 761 of the under cover 76. Furthermore, the entire flange 70 of the bolt 68 is biased uniformly downwardly by the conical spring 80.

Accordingly, even when the bolt 68 is not engaged with the nut 66, the bolt 68 does not move in the under cover 76. As a result, the bolt 68 does not make any noise in the under cover 76.

Further, the conical spring 80 maintains the position of the bolt 68 within the under cover 76. Thus, the bolt 68 remains aligned with the nut 66, so that it is very easy for an operator to initiate engagement of the bolt 68 with the nut 66 of the detachable roof section 38.

Moreover, the bolt 68 is covered by the under cover 76, so that the appearance is improved.

Furthermore, when the threaded portion 681 of the bolt 68 engages with and is threaded into the threaded hole of the nut 66 against the biasing force of the conical spring 80, the guiding means 50 is clamped between the flange 70 of the second bolt 68 and the projecting portion of the roof inner panel 58. In this condition, a portion of the tapered surface 72 of the bolt 68 is not in contact with a portion of the tapered hole 54 of the guiding means 50. The adjusting recess 74 is defined within the head portion 68, and when the bolt 68 is screwed, a coin or a screw driver is inserted into the adjusting recess 74.

The process of fastening the detachable roof section 38 to the front roof section 32 is disclosed hereinafter.

First, the detachable roof section 38 is mounted on the front and rear roof sections 32 and 36 of the vehicle. If the detachable roof section 38 is not properly located, the center line of the guiding means 50 is not aligned with the center line of the bolt 68. However, when the bolt 68 is threaded into the nut 66 against the biasing force of the conical spring 80, the tapered surface 72 of the bolt 68 contacts with the tapered hole 54 of the guiding means 50. As a result, the bolt 68 forces the detachable roof section 38 to move toward the proper position. Therefore, the detachable roof section 38 is properly positioned and a space, defined between the front edge of the detachable roof section 38 and the front roof section 32, is securely sealed.

Figure 10:
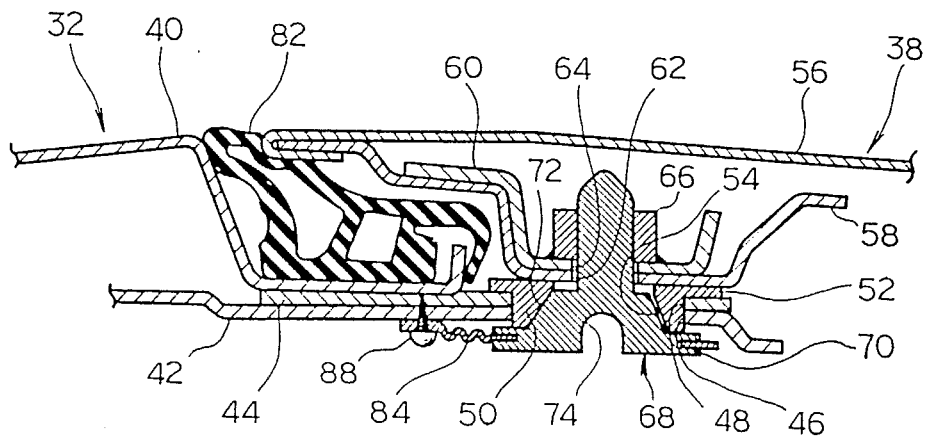
FIG. 10 is a cross-sectional view of a second embodiment of the third fastening means taken along the line VIII—VIII in FIG. 7, wherein the detachable roof section is positioned properly, and the detachable roof section is secured to the front roof section by the second bolt.
Figure 11:
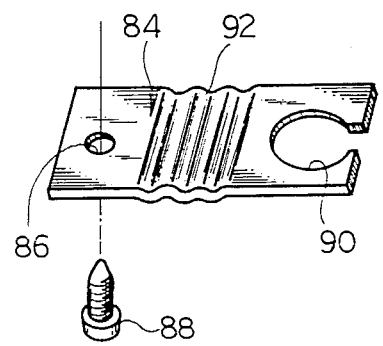
FIG. 11 is a perspective view of a holding means of the second embodiment.

FIGS. 10 and 11 show a second embodiment of the third fastening means according to the present invention. The second embodiment is substantially similar to the first embodiment shown in FIGS. 7 through 9.

However, the second embodiment uses a plate spring 84 as the holding means, instead of the conical spring 80 of the first embodiment.

As shown in FIG. 11, the plate spring 84 includes an aperture 86, an engagement recess 90 and a corrugated portion 92.

As shown in FIG. 10, the plate spring 84 is secured to the pillar inner panel 42 by a screw 88. The second bolt 68 is inserted into and engaged with an engagement recess 90 of the plate spring 84. The corrugated portion 92 of the plate spring 84 allows the bolt 68 to move in the vertical and longitudinal direction of the vehicle.

As described herein, the present invention overcomes the shortcomings of the known art by providing an automobile roof structure which includes a detachable roof section, a fixed roof section, fastening means including a first engaging member and a second engaging member and holding means.

While the present invention has been described in its preferred embodiments, it is to be understood that the invention is not limited thereto, and may be otherwise embodied within the scope of the following claims.

What is claimed is:

1. An automobile roof structure comprising:
a fixed roof section;
a bracket extending from said fixed roof section and having a hole therein extending between a first surface and a second opposite surface of said bracket;
a detachable roof section selectively mounted on the first surface of the bracket, said detachable roof section having an aperture;
fastening means comprising a first engaging member and a second engaging member, the first engaging member located adjacent the aperture of said detachable roof section, the second engaging member being selectively inserted into the hole of the bracket and the aperture of said detachable roof section, said second engaging member having a head portion adjacent the second surface of the bracket and an engaging portion projecting from the first surface of the bracket for selectively engaging the first engaging member; and
holding means having a first end and a second end, said first end being secured to said fixed roof section and said second end being secured to said second engaging member;
said holding means connecting said second engaging member to said fixed roof section and permitting withdrawal of the engaging portion of said second engaging member from said first surface of the bracket toward said second surface of the bracket to prevent said engaging portion from projecting from said first surface when said second engaging member is not engaged with said first engaging member.

2. The automobile roof structure of claim 1, wherein said second engaging member includes a securing groove and the second end of said holding means is inserted into the securing groove of the second engaging member.

3. The automobile roof structure of claim 1, wherein said holding means biases said second engaging member away from said fixed roof section.

4. The automobile roof structure of claim 3, further comprising an under cover secured to said fixed roof section, said under cover being located under the bracket.

5. The automobile roof structure of claim 4, wherein said under cover includes a bottom flange, whereby said second engaging member is biased toward the bottom flange by said holding means.

6. The automobile roof structure of claim 5, wherein the under cover includes a bottom aperture, said bottom aperture having an inner diameter which is less than an outer diameter of said second engaging member, whereby the second engaging member can not drop out from the under cover.

7. The automobile roof structure of claim 6, wherein the second engaging member further includes a bottom surface and an adjusting recess defined within said bottom surface.

8. The automobile roof structure of claim 7, wherein said adjusting recess has an inner diameter which is less than the inner diameter of said bottom aperture of said under cover.

9. An automobile roof structure comprising:
a fixed roof section;
a bracket extending from said fixed roof section and having a hole therein extending between a first surface and a second opposite surface of said bracket;
a detachable roof section selectively mounted on the first surface of the bracket, said detachable roof section and having an aperture;
fastening means comprising guiding means, a first engaging member and a second engaging member, said guiding means being mounted in the hole of the bracket and having a tapered hole therewithin, the tapered hole having an upper edge and a lower edge, the inner diameter of the lower edge being greater than the inner diameter of the upper edge, the first engaging member located adjacent the aperture of said detachable roof section, the second engaging member being selectively inserted into the tapered hole of the guide means and the aperture of the detachable roof section, the second engaging member having an engaging portion and a tapered surface, the engaging portion of the second engaging member projecting from the first surface of the bracket for selectively engaging the first engaging member, the tapered surface being adjacent the second surface of the bracket and having a first outer diameter and a second outer diameter, the first outer diameter being less than the second outer diameter, the first outer diameter being located adjacent the engaging portion, the second outer diameter located apart from the engaging portion; and
holding means having a first end and a second end, the first end of said holding means being secured to said fixed roof section, the second end of said holding means being secured to said second engaging member;

said holding means connecting said second engaging member to said fixed roof section and permitting withdrawal of the engaging portion of said second engaging member from said first surface of the bracket toward said second surface of the bracket to prevent said engaging portion from projecting from said first surface when said second engaging member is not engaged with said first engaging member.

10. The automobile roof structure of claim 9, wherein said second engaging member includes a securing groove and the second end of said holding means is inserted into the securing groove of the second engaging member.

11. The automobile roof structure of claim 9, wherein said holding means biases said second engaging member away from said fixed roof section.

12. The automobile roof structure of claim 11, further comprising an under cover secured to said fixed roof section, said under cover being located under said guide means.

13. The automobile roof structure of claim 12, wherein the under cover includes a bottom flange, whereby said second engaging member is biased toward said bottom flange by said holding means.

14. The automobile roof structure of claim 13, wherein said under cover includes a bottom aperture, said bottom aperture having an inner diameter which is less than the second outer diameter of said second engaging member, whereby the second engaging member can not drop out from the under cover.

15. The automobile roof structure of claim 9, wherein the second engaging member further includes a bottom surface and an adjusting recess defined within the bottom surface of said second engaging member.

16. An automobile roof structure comprising:
a fixed roof section including an edge and a bracket secured to said edge, said bracket extending in the longitudinal direction of the vehicle and having a hole therein extending between a first surface and a second opposite surface of said bracket;
a detachable roof section selectively mounted on the first surface of said bracket, said detachable roof section having an aperture, the aperture corresponding to the hole in the bracket of said fixed roof section;
guiding means mounted in the hole of the bracket, said guiding means having a tapered hole therewithin, the tapered hole having an upper edge and a lower edge, the inner diameter of the lower edge being greater than the inner diameter of the upper edge;
a first engaging member located adjacent the aperture of said detachable roof section;
a second engaging member being selectively inserted into the tapered hole of the guide means and the aperture of said detachable roof section, said second engaging member having an engaging portion and a tapered surface, the engaging portion of said second engaging member projecting from the first surface of the bracket for selectively engaging the first engaging member, the tapered surface being adjacent the second surface of the bracket and having a first outer diameter and a second outer diameter, the first outer diameter being less than the second outer diameter, the first outer diameter being located adjacent the engaging portion, the second outer diameter located apart from the engaging portion;
holding means having a first end and a second end, said first end being secured to said fixed roof section and said second end being secured to said second engaging member;
said holding means connecting said second engaging member to said fixed roof section and permitting withdrawal of the engaging portion of said second engaging member from said first surface of the bracket toward said second surface of the bracket to prevent said engaging portion from projecting from said first surface when said second engaging member is not engaged with said first engaging member.

17. The automobile roof structure of claim 16, wherein said second engaging member includes a securing groove and the second end of said holding means is inserted into the securing groove of the second engaging member.

18. The automobile roof structure of claim 17, wherein said holding means biases said second engaging member away from said fixed roof section.

19. The automobile roof structure of claim 18, further comprising an under cover secured to said fixed roof section, said under cover being located below said guide means.

20. The automobile roof structure of claim 19, wherein said under cover includes a bottom flange, whereby the second engaging member is biased toward said bottom flange of said under cover by said holding means.

* * * * *